United States Patent [19]

Nakanishi et al.

[11] Patent Number: 5,049,531
[45] Date of Patent: Sep. 17, 1991

[54] SILICON NITRIDE SINTERED BODY

[75] Inventors: Kenji Nakanishi, Komaki; Yo Tajima; Masakazu Watanabe, both of Nagoya, all of Japan

[73] Assignee: NGK Spark Plug Co., Ltd., Aichi, Japan

[21] Appl. No.: 403,289

[22] Filed: Sep. 7, 1989

[30] Foreign Application Priority Data

Sep. 9, 1988 [JP] Japan .................. 63-224764

[51] Int. Cl.$^5$ .............................. C04B 35/58
[52] U.S. Cl. ........................ 501/98; 501/97
[58] Field of Search ................... 501/97, 98

[56] References Cited

U.S. PATENT DOCUMENTS

| | | | |
|---|---|---|---|
| 4,304,576 | 12/1981 | Haitori | 51/309 |
| 4,449,989 | 5/1984 | Sarin et al. | 51/295 |
| 4,535,063 | 8/1985 | Matsuhiro | 501/97 |
| 4,560,669 | 12/1985 | Matsuhiro | 501/97 |
| 4,692,419 | 9/1987 | Matsui | 501/97 |
| 4,692,420 | 9/1987 | Oda | 501/97 |
| 4,696,778 | 9/1987 | Neil | 264/65 |
| 4,764,490 | 8/1988 | Yamakawa | 501/97 |
| 4,764,490 | 8/1988 | Yamakawa et al. | 501/97 |
| 4,777,822 | 10/1988 | Uemura et al. | 72/366 |
| 4,871,697 | 10/1989 | Hayakawa | 501/97 |

FOREIGN PATENT DOCUMENTS

| | | |
|---|---|---|
| 0117936 | 12/1984 | European Pat. Off. . |
| 2800174 | 7/1970 | Fed. Rep. of Germany ........ 501/97 |
| 57-71871 | 5/1982 | Japan ............ 501/97 |
| 57-166371 | 10/1982 | Japan ............ 501/97 |
| 57-188468 | 11/1982 | Japan ............ 501/97 |
| 58-64275 | 4/1983 | Japan ............ 501/97 |
| 68-15371 | 9/1983 | Japan ............ 501/97 |
| 59-190271 | 10/1984 | Japan ............ 501/97 |
| 59-190272 | 10/1984 | Japan ............ 501/97 |
| 60-65766 | 4/1985 | Japan ............ 501/97 |
| 60-131865 | 7/1985 | Japan ............ 501/97 |
| 61-178472 | 8/1986 | Japan ............ 501/97 |

Primary Examiner—William R. Dixon, Jr.
Assistant Examiner—Chris Gallo
Attorney, Agent, or Firm—Fish & Richardson

[57] ABSTRACT

A sintered body of silicon nitride having high strength, toughness and oxidation resistance consists essentially of, by weight percentages, 0.5 to 7.0% of a Mg component calculated as MgO, 0.5 to 7.0% of a Zr component calculated as $ZrO_2$, 0.5 to 10.0% of a Ce component calculated as $CeO_2$, and the balance being $Si_3N_4$. The sum of Mg, Zr and Ce components calculated as oxides is 3 to 20% by weight. This product is suitable for engine parts or cutting tools.

9 Claims, 1 Drawing Sheet

SILICON NITRIDE SINTERED BODY

FIELD OF THE INVENTION

This invention relates to a sintered body or product of silicon nitride, applicable to high-strength, wear resistant and heat resistant materials, such as engine components or machining tools.

BACKGROUND

Researches and proposals have been made for adding secondary components to silicon nitride for improving sinterability and machining properties of silicon nitride. For example, a method for adding MgO and $ZrO_2$ at specific ratios has been applied for patent in the name of the present Applicant and published under the Japanese Patent Kokoku Publications Nos. 60-16388(1965) and 60-20346(1985). Sintered bodies containing strontium (Sr), magnesium (Mg), cerium (Ce) and zirconium (Zr) compounds or additionally containing aluminum compounds have also been proposed under the Japanese Patent Kokoku Publication No. 61-40621(1986) and Japanese Patent Kokai Publication No. 62-65976(1987).

SUMMARY OF THE DISCLOSURE

It is an object of the present invention to provide a novel sintered body or product of silicon nitride which is improved further in sinterability and mechanical properties, such as strength and toughness, and which is also superior in oxidation resistance.

For accomplishing the above object, the present invention provides a sintered body of silicon nitride consisting essentially of 0.5 to 7.0 wt. % of magnesium (Mg) calculated as MgO, 0.5 to 7.0 wt. % of zirconium (Zr) calculated as $ZrO_2$, 0.5 to 10.0 wt. % of cerium (Ce) calculated as $CeO_2$, and the balance being $Si_3N_4$.

In the above basic composition, Mg, Zr and Ce cooperate with silicon (Si), nitrogen (N) and oxygen (O) to form a liquid phase among the $Si_3N_4$ particles. During a subsequent temperature decreasing process, this liquid phase solidifies into a vitreous mass in which the $Si_3N_4$ particles are bonded to one another to produce a dense fine microstructure of the vitreous mass. It is contemplated that Mg, Zr and Ce, when added together at specific ratios, act synergistically to promote densification, and that the addition of these three components promotes the growth of the $Si_3N_4$ columnar crystals to improve further the strength, toughness and thermal resistance of the sintered body of silicon nitride.

The above numerical limitation of the components represents an optimum range in producing the sintered body of silicon nitride exhibiting high density, strength, toughness and thermal resistance on the basis of the synergistic effects of the aforementioned three components in densification and in developing the $Si_3N_4$ columnar crystals. The following is the more detailed reason for such numerical limitation, in which percents (%) indicates those by weight calculated on each oxide.

(a) Lower limit values of Mg, Zr and Ce components

If any of these components are less than the lower limit values of 0.5%, the effect of densification and developing the $Si_3N_4$ columnar crystals cannot be exhibited satisfactorily.

Above all, if the content of MgO is less than the lower limit value, the liquid phase necessary for densification of the texture during sintering cannot be formed sufficiently.

(b) Upper limit values of Mg, Zr and Ce components

If any of these components exceed the upper values, the above mentioned synergistic effects cannot be exhibited. Above all, (i) as for the Mg component, if the content of Mg exceeds the upper value of 7.0%, MgO is volatalized at the time of sintering to produce numerous pores to interfere with densification.

(ii) As for the Zr component, $ZrO_2$ yields, during sintering, a crystallizable compound shown by the formula $ZrO_xN_yC_z$, where x, y and z stand for any arbitrary numbers, is produced. When heated up to about 700° C. or more in air, this compound is converted again into $ZrO_2$, during which, the molar volume of the compound is increased. Thus, with the contents of the Zr component above the upper limit of 7.0%, the oxidation resistance is markedly lowered, such that cracks may be formed in the sintered body.

(iii) Finally, as for the Ce component, if the content of Ce exceeds the upper limit value of 10.0%, the amount of the vitreous phase becomes excessive, so that the strength and the toughness of the sintered product are lowered considerably.

Based on this basic composition, the sintered body having a strength of not less than 80 kgf/mm², oxidation resistance of not more than 0.3 mg/cm², as measured from the increase in weight after lapse of 100 hours at 800° C., may be obtained in accordance with the present invention. A composition of 1 to 5% of Mg component, 1 to 7% of Zr component and 1 to 8% of Ce component, with the sum of these components being 3 to 20%, each calculated on oxide, is preferred, since it gives the sintered body having the fracture toughness of not less than 6 MPa.m$^{\frac{1}{2}}$ and a relative density of not less than 95%.

According to the present invention, sinterability of $Si_3N_4$ may be improved by the synergistic effects of the three components of Mg, Zr and Ce, such that the novel $Si_3N_4$ sintered body may be obtained, which has a fine microstructure, that is, a high density, and which is superior in various mechanical properties, such as strength or toughness, or in oxidation resistance. In addition, such sintered body may be provided by a method which is suitable for mass production.

Meanwhile, only the three elements Mg, Zr and Ce are essential components of the sintered body of the present invention besides the $Si_3N_4$ component. Strontium (Sr) is not an essential component, unlikely in the Japanese Patent Kokoku Publication No. 61-40621(1986), so that the operational control may be significantly simplified while mass producibility may simultaneously be improved. Although the sintered body of the present invention is of a ternary system, it has the strength and fracture toughness equal or superior to those of the comparable product disclosed in the above mentioned Japanese Patent Kokoku Publication. Moreover, the sintered product of the present invention has the hardness and oxidation resistance promisingly superior to those of the product of this Kokoku Publication. Thus the $Si_3N_4$ sintered body of the present invention finds extensive usage as various high temperature and high strength materials for automotive engine parts, wear-resistant members or machining tools.

BRIEF DESCRIPTION OF THE DRAWINGS

The sole FIGURE illustrates, in a triangular coordinate system, the compositional ranges of Mg, Zr and Ce components, calculated as corresponding oxides.

DESCRIPTION OF PREFERRED EMBODIMENTS

Figure 1:
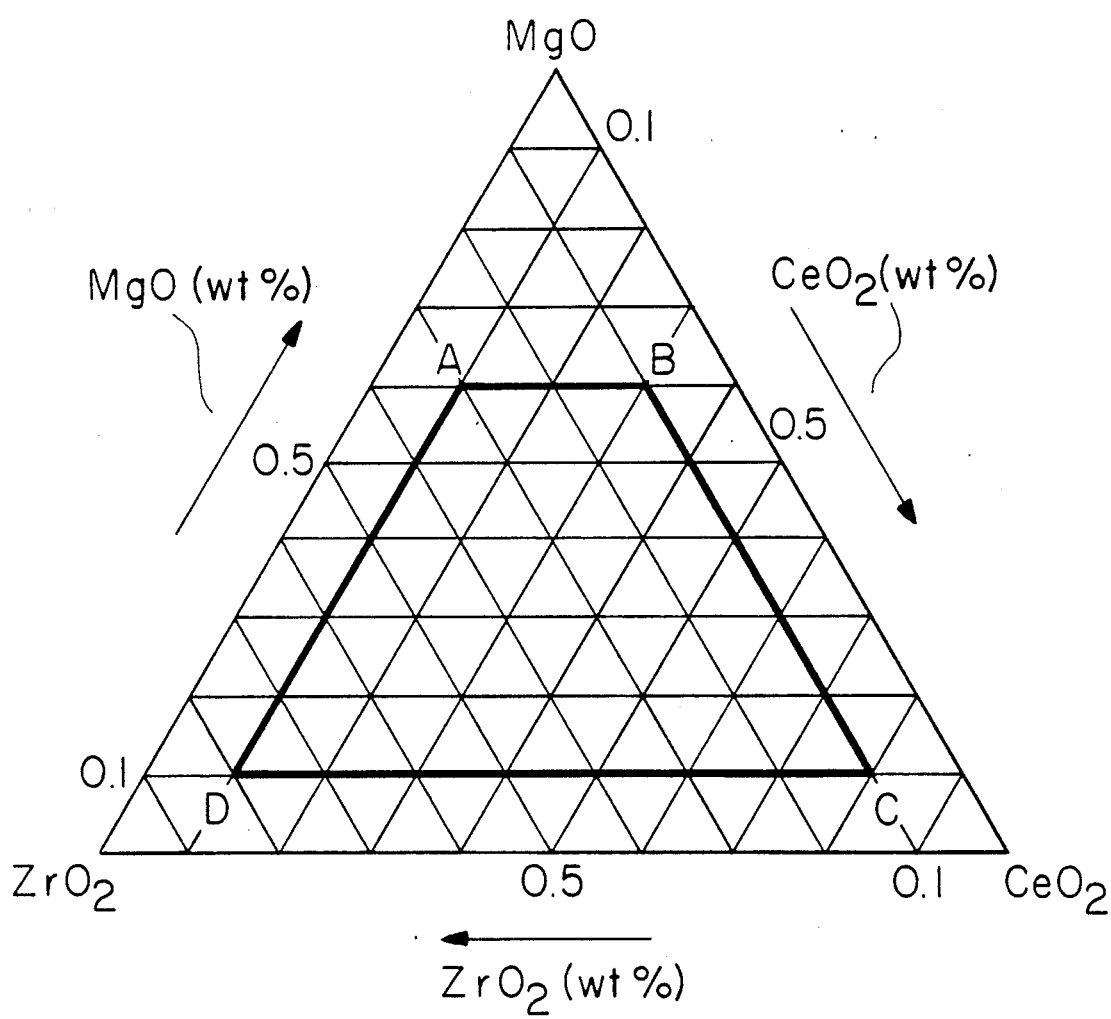

Preferably, the contents of Mg, Zr and Ce components are 1 to 5%, 1 to 7% and 1 to 8%, respectively, based on the corresponding oxides, with the sum of the components being 3 to 20%. More preferably, these contents are 2 to 5%, 2 to 5% and 2 to 8%, based on the corresponding oxides, with the sum of the components being 6 to 15%. In this manner, the synergistic effects of the three components in densification and promoting the growth of the $Si_3N_4$ columnar crystal may be developed more satisfactorily. The reason for defining the compositional ratios in the corresponding oxides, such as MgO, $ZrO_2$ and $CeO_2$, is that the elements Mg, Zr and Ce may exist in the sintered body alone or in the form of various compounds, such as oxides, nitrides or carbides. More specifically, these elements may exist in the form of $Mg_2SiO_4$ (forsterite) or further complex solid solutions, such as $ZrO_xN_yC_z$ where x, y and z stand for numbers, in addition to being in the form of MgO, $ZrO_2$ (especially as cubic system), and $CeO_2$. Meanwhile, the phases yielded may take different forms, depending on the difference in the mixing ratios of the Mg, Zr and Ce components and the sintering method. For example, while the cubic system $ZrO_2$ may be produced by either sintering under an atmospheric pressure or pressure sintering, $Mg_2SiO_4$ may be produced only by the pressure sintering. These essential auxiliary components exist as the crystal phase or amorphous vitreous phase in the $Si_3N_4$ grain boundaries.

The sum of the Mg, Zr and Ce components is preferably 3 to 20% and more preferably 6 to 15%. Sufficient densification may not be realized with the sum of the components less than 3%. On the other hand, the strength and the toughness, the properties intrinsic to $Si_3N_4$ cannot occasionally be developed if the sum of the contents exceeds 20%.

The above described favorable effects cannot be realized with use of only one of the Mg, Zr and Ce components. On the contrary, the properties of the $Si_3N_4$ sintered body may be improved further by controlling the compositional ratios of the three components. Thus it is preferred that, under the conditions of the above described basic composition and of the sum of the contents of the Mg, Zr and Ce components being in the range of 3 to 20%, these three components be in the range delimited by straight lines interconnecting the following four points A, B, C and D:

A (0.6, 0.3, 0.1),
B (0.6, 0.1, 0.3),
C (0.1, 0.1, 0.8), and
D (0.1, 0.8, 0.1).

in the triangular coordinate system of MgO, $ZrO_2$, and $CeO_2$ for the ternary system shown in the drawing. When the three components are within the above range, it is possible to obtain the strength of not less than 90 kgf/mm$^2$, the toughness of not less than 6.5 MPa.m$^{\frac{1}{2}}$, the density of not less than 96% and the oxidation resistance of not more than 0.3 mg/cm$^2$, as well as to develop sufficient synergistic effects of the three Mg, Zr and Ce components in improving the density and promoting the growth of the $Si_3N_4$ columnar crystals. Meanwhile, the triangular coordinate system indicates the Mg, Zr and Ce components along the sides of an equilateral triangle extending from one apex to another, with each apex representing one of the Mg, Zr and Ce components, in which each amount of the components being shown as the respective compositional ratios from 0 to 1, with the sum of the three components being always equal to 1.

It is seen from above that the amount of the sum of MgO, $ZrO_2$ and $CeO_2$ and the compositional ratios of these three components play an important role in the present invention. $ZrO_2$, above all, is effective in the densification, and the densification up to a relative density of 99% may be realized in Examples 2, 4, 5 and 10 in which $ZrO_2$ is added in an amount of not less than 5%. On the other hand, oxidation resistance tends to be deteriorated with increase in the $ZrO_2$ content.

Meanwhile, the extent of densification of the sintered body may be determined, depending on the applied field of the sintered product. Thus it cannot be said conclusively that the denser sintered body is more preferred. However, if the contents of the three components are within the preferred range of the present invention, a sintered body may be produced which is superior in one or more properties of the strength, toughness and oxidation resistance, even though the density somewhat falls short as far as the relative density is still at least 92%.

The following conditions for preparation of the $Si_3N_4$ sintered body of the present invention may, for example, be employed. The starting powders of $Si_3N_4$, the Mg component, Zr component and Ce component, having a BET specific surface area of not less than 5 m$^2$/g (or preferably not less than 8 m$^2$/g), are desirably employed. The alpha ($\alpha$) ratio of the $Si_3N_4$ powders of not less than 50% (or more preferably not less than 80%), is desirably employed. The level of the metal impurities is preferably not more than 0.5 wt % and more preferably not more than 0.1 wt %. The starting powders of the Mg component, Zr component and Ce component are preferably oxides or may be converted during the sintering process into oxides, such as salts, inclusive of carbonates, or hydroxides. These components, when used as the powders, are preferably of BET specific surface area of not less than 5 m$^2$/g. For mixing, a rotary mill or an attriter of the wet or dry type may be employed. For wet mixing, water or alcohol may be employed. For preventing the impurities from going into the mixture, $Si_3N_4$ or synthetic resins are preferred as the lining of the mill and/or balls.

As for forming, any conventional molding methods, such as press molding, slip cast molding or injection molding, may be employed. As for sintering, the sintering under atmospheric pressure, or pressure sintering such as gas pressure sintering or HIP sintering is employed. The molded product formed of these powders may also be sintered by non-pressure sintering, that is, by sintering under atmospheric pressure. Thus the $Si_3N_4$ sintered bodies of complex profile having superior properties, such as mechanical strength, may be produced easily. The sintering temperature is preferably 1500° to 1800° C. The sintering under atmospheric pressure is preferably carried out in the presence of $N_2$ at an atmospheric pressure and at a temperature of 1500° to 1800° C. The gas pressure sintering is preferably carried out in the presence of $N_2$ under a pressure of 10 to 100 atm. and at a temperature of 1700° to 1900° C. In the sintering under atmospheric pressure, secondary sintering is preferably carried out under an atmosphere placed under pressure. In such case, the above described synergistic effects of the three Mg, Zr and Ce components in the densification of the sintered product may be achieved more satisfactorily. The secondary sintering is preferably carried out under a pressurized atmosphere having a nitrogen partial pressure of not less than 10 atmospheres at a sintering temperature of 1700° to 1900° C.

The $Si_3N_4$ sintered body, produced in accordance with the present invention, may have the relative density of not less than 95%, preferably not less than 96% and more preferably not less than 97%, the strength of not less than 80 kgf/mm², preferably not less than 90 kgf/mm², the fracture toughness of not less than 6 MPa.m$^{\frac{1}{2}}$ (preferably not less than 6.5 MPa.m$^{\frac{1}{2}}$), and the weight increment on oxidation of not more than 0.30 mg/cm² (preferably not more than 0.15 mg/cm²). The $Si_3N_4$ sintered body thus produced may be advantageously employed as automotive engine parts, such as piston valves, machining tools, such as sliding members inclusive of bearing balls, or as heat engine parts such as gas turbine rotors.

Certain properties of the sintered products were measured and calculated by the methods (a) to (d). The results are also shown in Table 1.
(a) Relative Density (by Alchimedes method)
(b) Strength (by JIS R1601)
(c) Fracture Toughness (by indentation strength method)
(d) Oxidation Resistance (by measuring weight increase after the samples were left in air at 800° C. for 100 hours)

TABLE 1

| sample Nos. | Composition (wt %) | | | | MgO + ZrO₂ + CeO₂ | Mixing ratio (%) | | | Relative density (%) | Strength (kgf/mm²)** | Toughness (MPam$^{\frac{1}{2}}$) | Oxidation resistance (mg/cm²) |
|---|---|---|---|---|---|---|---|---|---|---|---|---|
| | MgO | ZrO₂ | CeO₂ | Si₃N₄ | | MgO | ZrO₂ | CeO₂ | | | | |
| 1 | 2 | 2 | 2 | 94 | 6 | 33 | 33 | 33 | 97 | 100 | 7.2 | 0.02 |
| 2 | 2 | 5 | 2 | 91 | 9 | 22 | 55 | 22 | 99 | 91 | 6.5 | 0.12 |
| 3 | 4 | 4 | 4 | 88 | 12 | 33 | 33 | 33 | 98 | 101 | 7.7 | 0.11 |
| 4 | 5 | 5 | 2 | 88 | 12 | 42 | 42 | 16 | 99 | 95 | 7.4 | 0.12 |
| 5 | 5 | 7 | 2 | 86 | 14 | 36 | 50 | 14 | 99 | 92 | 6.9 | 0.22 |
| 6 | 5 | 2 | 5 | 88 | 12 | 42 | 16 | 42 | 96 | 93 | 7.0 | 0.11 |
| 7 | 1 | 1 | 4 | 94 | 6 | 17 | 17 | 66 | 96 | 95 | 7.3 | 0.09 |
| 8 | 3 | 3 | 6 | 88 | 12 | 25 | 25 | 50 | 97 | 95 | 7.6 | 0.12 |
| 9 | 5 | 2 | 8 | 85 | 15 | 33 | 13 | 54 | 97 | 106 | 7.6 | 0.15 |
| 10 | 5 | 5 | 5 | 85 | 15 | 33 | 33 | 33 | 99 | 90 | 7.6 | 0.12 |
| *11 | 0 | 4 | 3 | 93 | — | — | — | — | 65 | 32 | 3.5 | —(note 1) |
| *12 | 4 | 0 | 5 | 91 | — | — | — | — | 71 | 29 | 3.1 | — |
| *13 | 3 | 5 | 0 | 92 | — | — | — | — | 88 | 37 | 3.8 | — |
| *14 | 8 | 4 | 3 | 85 | — | — | — | — | 90 | 51 | 4.2 | 0.31 |
| *15 | 4 | 10 | 5 | 81 | — | — | — | — | 99 | 72 | 5.0 | cracks formed |
| *16 | 3 | 5 | 12 | 80 | — | — | — | — | 98 | 54 | 4.0 | 0.22 |

*Comparative Example
**1 kgf/mm² ≈ 9.8 MPa
Note 1:
Oxidation resistance was not measured on Samples Nos. 11 to 13 because such measurement was thought to be of no avail in view of the markedly low relative density.

EXAMPLES

The present invention will be explained hereinbelow by referring to Examples of the present invention and comparative examples.

EXAMPLE 1

Powders of $Si_3N_4$, $MgCO_3$, $ZrO_2$ and $CeO_2$, having values of the BET specific surface areas of 10 m²/g, 20 m²/g, 14 m²/g and 13 m²/g, respectively, were weighted out at the ratios shown in Table 1, and wet mixing was continued for 16 hours, using balls and ball mill formed of $Si_3N_4$. The resulting mixture was dried and molded in a metallic mold under a pressure of 1500 kgf/cm². The resulting molded product was sintered at 1700° C. for two hours under a nitrogen atmosphere maintained at 1 atm. to produce samples Nos. 1 to 16 of the sintered products of silicon nitride.

It is seen from Table 1 that, although the samples Nos. 1 to 10 of the sintered product of Example 1 were sintered under atmospheric pressure, they are unexceptionally superior in the density, strength and fracture toughness. The extent of increase in weight on oxidation also presents no practical inconveniences. Conversely, the properties of the samples Nos. 11 to 16 of the comparative examples are undesirable in certain aspects. That is, in the absence of any one of the three components, as in sample Nos. 11 to 13, a sufficient densification may not be achieved. In case of excess in the Mg component, as in sample No. 14, a sufficiently dense product is similarly not obtained. In case of excess in the Zr component, as in sample No. 15, the oxidation resistance remains inferior. Finally, in case of excess in the Ce component as in sample No. 16, strength and toughness are lowered because of the presence of the excess vitreous phase in the grain boundary region.

EXAMPLE 2

The sample Nos. 1, 2, 3, 8 and 9 of the sintered products of the preceding Example 1 were subjected to further sintering at 1800° C. under a nitrogen atmosphere of 80 atm. for two hours to produce samples Nos. 17 to 21 of the $Si_3N_4$ sintered products. The properties of these samples were measured and calculated as in Example 1. The results are shown in Table 2.

TABLE 2

| Sample Nos. | Composition (wt %) | | | | Relative density (%) | Strength (kgf/mm²) | Toughness (MPam$^{\frac{1}{2}}$) | Oxidation resistance (mg/cm²) |
|---|---|---|---|---|---|---|---|---|
| | MgO | ZrO₂ | CeO₂ | Si₃N₄ | | | | |
| 17 | 2 | 2 | 2 | 94 | 100 | 115 | 8.1 | 0.07 |
| 18 | 2 | 5 | 2 | 91 | 100 | 101 | 7.9 | 0.10 |
| 19 | 4 | 4 | 4 | 88 | 100 | 115 | 8.1 | 0.11 |
| 20 | 3 | 3 | 6 | 88 | 100 | 93 | 7.8 | 0.09 |

TABLE 2-continued

| Sample Nos. | Composition (wt %) | | | | Relative density (%) | Strength (kgf/mm²) | Toughness (MPam^½) | Oxidation resistance (mg/cm²) |
| --- | --- | --- | --- | --- | --- | --- | --- | --- |
| | MgO | ZrO₂ | CeO₂ | Si₃N₄ | | | | |
| 21 | 5 | 2 | 8 | 85 | 100 | 122 | 8.3 | 0.09 |

It is seen from Table 2 that the sintered products obtained by such two-step sintering are completely densified and superior in the mechanical strength and toughness.

EXAMPLE 3

Using the technique similar to that of Example 1, samples Nos. 22 and 23 of the sintered products were produced in accordance with the composition shown in Table 3.

TABLE 3

| Sample Nos. | Composition (wt %) | | | | | Relative density | Strength (kgf/mm²) |
| --- | --- | --- | --- | --- | --- | --- | --- |
| | MgO | ZrO₂ | CeO₂ | Si₃N₄ | Other component | | |
| 22 | 2 | 2 | 2 | 94 | — | 98% | 104 |
| 23* | 2 | 2 | 2 | 92 | 2 (SrO) | 83% | 48 |

*Sample No. 23: Comparative Sample.

In the sample No. 22, which is of the same composition as the sample No. 1, except that powder of MgO having a specific surface area of 5 m²/g was employed as the starting component. In the sample No. 23, the same MgO powder and SrO powder having a specific surface area of 5 m²/g were employed.

The properties of the samples were measured after sintering at atmospheric pressure at 1700° C. for two hours. The results are also shown in Table 3.

It is seen that the inclusion of SrO in the starting composition results in markedly lowered sinterability and hence in concomitantly lowered mechanical strength, as may be seen for the sample No. 23 containing SrO.

It should be noted that modifications in the art may be done without departing from the gist and concept of the present invention as disclosed herein within the scope of the claims as appended hereinbelow.

What is claimed is:

1. A sintered body of silicon nitride consisting essentially of, in weight percentages of the body, 0.5 to 7.0% of a Mg component calculated as MgO, 0.5 to 7.0% of a Zr component calculated as $ZrO_2$, 0.5 to 10.0% of a Ce component calculated as $CeO_2$, and the balance being $Si_3N_4$,
said body having a strength of not less than 80 kgf/mm², a fracture toughness of not less than 6 MPa m^½, a relative density of not less than 95% of theoretical density and a weight increase after oxidation testing at 800° C. for 100 hours of no more than 0.3 mg/cm².

2. The sintered body of silicon nitride according to claim 1 wherein the sum of Mg, Zr and Ce components calculated as MgO, $ZrO_2$ and $CeO_2$, respectively, is 3 to 20% by weight.

3. The sintered body of silicon nitride according to claim 2 wherein the Mg, Zr and Ce components are within a range defined by straight lines interconnecting points A, B, C and D on drawing FIG. 1:
A (0.6, 0.3, 0.1),
B (0.6, 0.1, 0.3),
C (0.1, 0.1, 0.8), and
D (0.1, 0.8, 0.1)
in a ternary triangular coordinate system of MgO, $ZrO_2$ and $CeO_2$, wherein the numbers stand for weight percents of the components.

4. The sintered body according to claim 1 consisting essentially of 2 to 5% by weight of the Mg component, 2 to 5% by weight of the Zr component and 2 to 8% by weight of the Ce component, the sum of these components being 6 to 15% by weight, each component being calculated as each said oxide.

5. The sintered body of silicon nitride according to claim 1 consisting essentially of 1 to 5% by weight of the Mg component, 1 to 7% by weight of the Zr component and 1 to 8% by weight of the Ce component, the sum of these components being 3 to 20% by weight, each component being calculated as each said oxide.

6. The sintered body of silicon nitride according to claim 3 having a strength of not less than 90 kgf/mm², fracture toughness of not less than 6.5 MPa.m^½, a relative density of not less than 96% and a weight increase, when tested, after oxidation testing at 800° C. for 100 hours of not more than 0.3 mg/cm².

7. The sintered body of silicon nitride according to claim 6 having a weight increase, when tested after oxidation testing at 800° C. for 100 hours of not more than 0.15 mg/cm².

8. The sintered body of silicon nitride according to claim 6 having a relative density of not less than 99%.

9. The sintered body of silicon nitride according to claim 6 having the fracture toughness of not less than 7 MPa.m^½.

* * * * *